United States Patent
Soonthornwinate

(10) Patent No.: US 11,155,198 B2
(45) Date of Patent: Oct. 26, 2021

(54) ROTATABLE BED FOR A PICKUP TRUCK

(71) Applicant: Toyota Motor Engineering & Manufacturing North America, Inc., Plano, TX (US)

(72) Inventor: Tarakorn Soonthornwinate, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 87 days.

(21) Appl. No.: 16/459,882

(22) Filed: Jul. 2, 2019

(65) Prior Publication Data
US 2021/0001763 A1    Jan. 7, 2021

(51) Int. Cl.
*B60P 1/32* (2006.01)
*B60P 1/20* (2006.01)
*G05D 1/02* (2020.01)
*B60P 1/34* (2006.01)

(52) U.S. Cl.
CPC ..................... *B60P 1/32* (2013.01); *B60P 1/20* (2013.01); *B60P 1/34* (2013.01); *G05D 1/0257* (2013.01); *B60Y 2200/16* (2013.01)

(58) Field of Classification Search
CPC .. B60P 1/48; B60P 1/02; B60P 1/6454; B60P 1/5466; B60P 1/32; B60P 3/12; B60P 1/483; B60P 1/486; B60P 1/20; B60Y 2200/16
USPC .......... 414/546, 482, 483; 104/44, 45; 410/1
See application file for complete search history.

(56) References Cited

U.S. PATENT DOCUMENTS

| 2,621,072 | A | * | 12/1952 | Sherburne | B60P 1/28 298/9 |
| 5,328,320 | A | * | 7/1994 | Farrow | B60P 1/02 254/10 C |
| 5,393,191 | A | * | 2/1995 | Alexander | B60P 1/43 414/477 |
| 6,371,564 | B1 | | 4/2002 | Yates et al. | |
| 7,059,666 | B2 | | 6/2006 | Harrison | |
| 7,427,183 | B2 | * | 9/2008 | Stabeno | B60P 3/122 414/482 |
| 10,233,062 | B2 | * | 3/2019 | Cheng | B66F 7/28 |

(Continued)

FOREIGN PATENT DOCUMENTS

WO    2005021321 A1    3/2005

*Primary Examiner* — Dennis H Pedder
*Assistant Examiner* — Joyce Eileen Hill
(74) *Attorney, Agent, or Firm* — Christopher G. Darrow; Darrow Mustafa PC

(57) ABSTRACT

A pickup truck can include a bed that is configured to be rotatable. The bed can be defined in part by a first side wall, a second side wall, a front wall, a back wall, and a floor. The bed can include a standard position in which the first and second side walls of the bed can be substantially parallel to a longitudinal direction of the pickup truck. The bed can be selectively rotatable about an axis of rotation into one or more rotated positions. In a rotated position, the first and second side walls can be angled relative to the longitudinal direction. The bed can also be raised in an elevational direction such that a lowermost point of the bed is located above a chassis frame of the pickup truck. A rotatable bed can expand its uses and allow for convenient access to the bed from a desired position.

18 Claims, 12 Drawing Sheets

(56) References Cited

U.S. PATENT DOCUMENTS

| | | | |
|---|---|---|---|
| 2005/0254928 A1* | 11/2005 | Budd | B60P 1/5466 |
| | | | 414/543 |
| 2007/0108801 A1 | 5/2007 | Huotari et al. | |
| 2009/0091096 A1* | 4/2009 | Samaniego | B60P 1/02 |
| | | | 280/6.153 |
| 2017/0043698 A1* | 2/2017 | Gentile | B60P 1/32 |

* cited by examiner

ROTATABLE BED FOR A PICKUP TRUCK

FIELD

The subject matter described herein relates in general to pickup trucks and, more particularly, to pickup truck beds.

BACKGROUND

Some motor vehicles have storage spaces located behind a passenger seating area. For example, pickup trucks are motor vehicles with a rear open-top cargo area, which is commonly referred to as a bed, located behind a passenger cabin. The bed allows the pickup truck to be utilized in many different ways, including carrying or storing various types of cargo (e.g., tools, groceries, sporting equipment, etc.). Some beds can include features to facilitate the securing and/or transport of cargo loaded within the bed, such as tie down members and accessory rails.

SUMMARY

In one respect, the present disclosure is directed to a bed manipulation system for a pickup truck. The pickup truck can include a bed. The bed can be defined in part by a first side wall, a second side wall, a front wall, a back wall, and a floor. The bed can include a standard position. In the standard position, the first side wall and the second side wall of the bed can be substantially parallel to a longitudinal direction of the pickup truck. The bed can be selectively rotatable about an axis of rotation into one or more rotated positions. When the bed is in a rotated position, the first side wall and the second side wall of the bed can be angled relative to the longitudinal direction, and the bed can be raised in an elevational direction such that a lowermost point of the bed is located above a chassis frame of the pickup truck.

In another respect, the present disclosure is directed to a bed manipulation method for a pickup truck. The pickup truck can include a bed. The bed can be defined in part by a first side wall, a second side wall, a front wall, a back wall, and a floor. The bed can include a standard position in which the first side wall and the second side wall are substantially parallel to a longitudinal direction of the pickup truck. The bed can be selectively rotatable about an axis of rotation into one or more rotated positions. The method can include, responsive to receiving a user input to rotate the bed, causing the bed to move from the standard position to a rotated position. When the bed is in a rotated position, the first side wall and the second side wall of the bed can be angled relative to the longitudinal direction, and the bed can be raised in an elevational direction such that a lowermost point of the bed is located above a chassis frame of the pickup truck.

DETAILED DESCRIPTION

Figure 1:
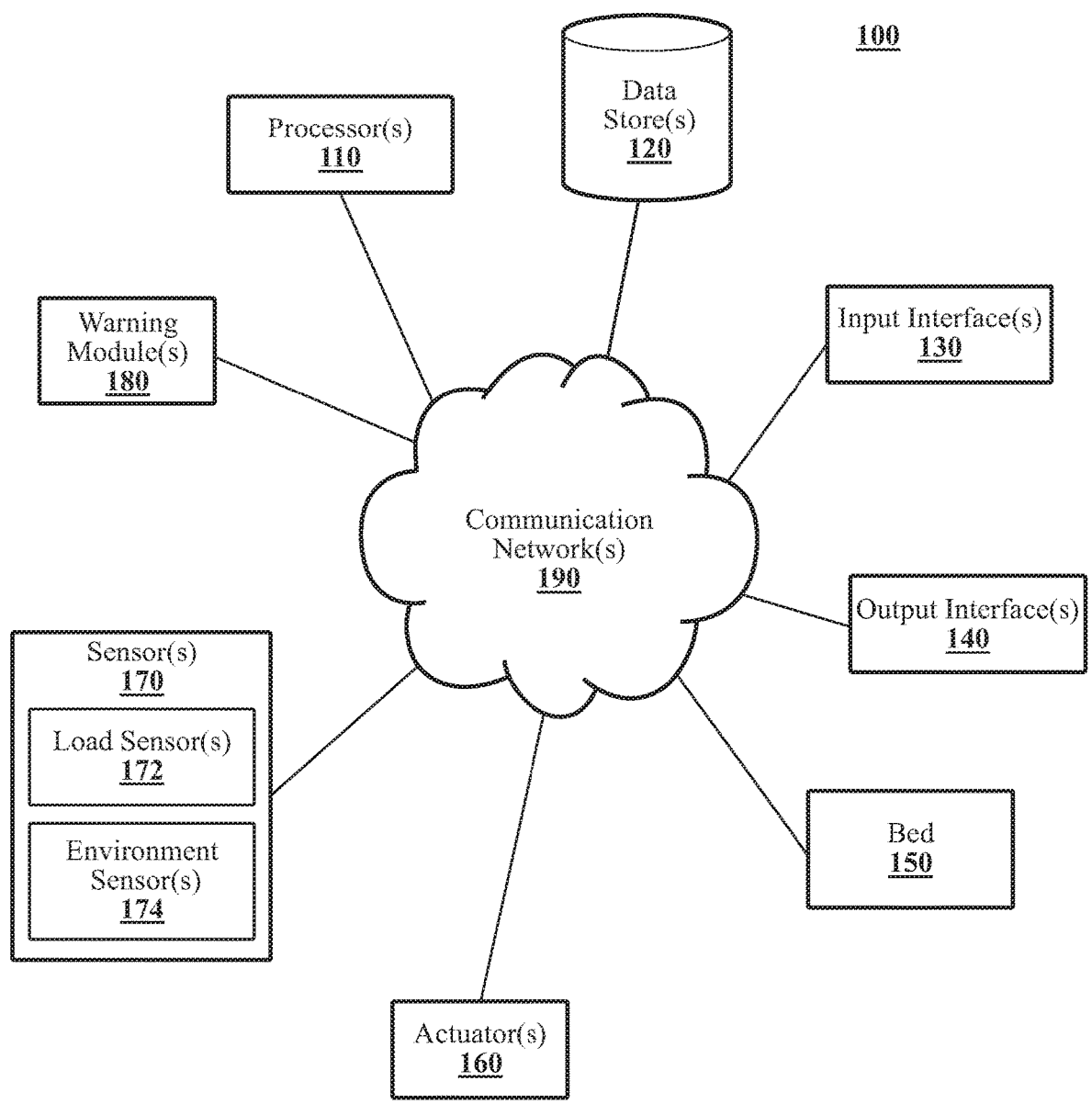
FIG. 1 is an example of a bed manipulation system for a pickup truck.

Pickup trucks can offer the convenience of an easily accessible cargo area. Lowering the tailgate of the cargo area (herein referred to as a "bed") at a rear of the pickup truck can facilitate the loading and unloading of cargo. However, there may be circumstances in which is inconvenient, undesirable, difficult, or even impossible to load or unload cargo from the back end of the pickup truck. Accordingly, arrangements described herein are directed to a pickup truck with a bed that can be selectively rotated into one or more rotated positions. In the one or more rotated positions, the side walls of the bed can be angled relative to a longitudinal direction of the pickup truck. In some arrangements, the bed can also be configured to position the bed such that its rotation will not result in the bed coming into contact with other portions of the pickup truck, such as the cabin or chassis frame. As an example, the bed can be configured to be raised in an elevational direction such that a lowermost point of the bed is located above a chassis frame and/or the top of the rear tires of the pickup truck. The present detailed description relates to apparatus, systems, and/or methods that incorporate one or more of such features. In at least some instances, arrangements described herein can expand the uses of the pickup truck bed and allow for convenient access to the bed from a desired position. Thus, arrangements described herein can enable greater flexibility to a user in loading and unloading items from the bed and/or for other purposes.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-12, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of at least a portion of a bed manipulation system 100 is shown. Some of the possible elements of the bed manipulation system 100 are shown in FIG. 1 and will now be described. It will be understood that it is not necessary for the bed manipulation system 100 to have all of the elements shown in FIG. 1 or described herein. The bed manipulation system 100 can include one or more processors 110, one or more data stores 120, one or more input interfaces 130, one or more output interfaces 140, a bed 150, one or more actuators 160, and one or more sensors 170, and/or one or more warning module(s) 180. In one or more arrangements, at least some of these various elements can be located onboard a pickup truck. In one or more arrangements, all of the various elements can be located onboard a pickup truck. In one or more arrangements, at least one of these elements can be located remote from the pickup truck.

The various elements of the bed manipulation system 100 can be communicatively linked to each other (or any combination thereof) through one or more communication networks 190. As used herein, the term "communicatively linked" can include direct or indirect connections through a communication channel or pathway or another component or system. A "communication network" means one or more components designed to transmit and/or receive information from one source to another. The data store(s) 120 and/or one or more of the elements of the bed manipulation system 100 can include and/or execute suitable communication software, which enables the various elements to communicate with each other through the communication network(s) 190 and perform the functions disclosed herein.

The one or more communication networks 190 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The one or more communication networks 190 further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long-range (e.g., a mobile, cellular, and/or satellite-based wireless network; GSM, TDMA, CDMA, WCDMA networks or the like). The communication network(s) 190 can include wired communication links and/or wireless communication links. The communication network(s) 190 can include any combination of the above networks and/or other types of networks, now known or later developed.

Each of the above-noted elements of the bed manipulation system 100 will be described in turn below. The bed manipulation system 100 can include one or more processors 110. "Processor" means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other.

The bed manipulation system 100 can include one or more data stores 120 for storing one or more types of data. The data store(s) 120 can include volatile and/or non-volatile memory. Examples of suitable data stores 120 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 120 can be a component of the processor(s) 110, or the data store(s) 120 can be operatively connected to the processor(s) 110 for use thereby. The term "operatively connected," as used throughout this description, can include direct or indirect connections, including connections without direct physical contact.

The bed manipulation system 100 can include one or more input interface(s) 130. An "input interface" includes any device, component, system, element or arrangement or groups thereof that enable information, data, instructions, and/or commands to be entered into a machine. The input interface(s) 130 can be configured to receive an input from a user. The input interface(s) 130 can include one or more user interface elements, including, for example, keypad(s), display(s), touch screen(s), multi-touch screen(s), button(s), switch(s), dial(s), joystick(s), a mouse/mice, trackball(s), microphone(s), and/or combinations thereof. In one or more arrangements, the input interface(s) 130 can be configured to receive user inputs relating to the bed manipulation system 100. In one or more arrangements, the input interface(s) 130 can be provided in any suitable location onboard the pickup truck, including on the exterior of the pickup truck, within the interior of the pickup truck, within a cargo space of the pickup truck, and/or on the bed 150. In one or more arrangements, the input interface(s) 130 can be provided on a remote device and/or a portable device, such as a key fob or a portable communication device (e.g., smartphone, tablet computer, etc.).

The bed manipulation system 100 can include one or more output interface(s) 140. An "output interface" includes any device, component, system, element or arrangement or groups thereof that enable information or data to be presented to a user (e.g., a person, a pickup truck occupant, etc.). Some components may serve as both a component of the input interface(s) 130 and a component of the output interface(s) 140. The output interface(s) 140 can include display(s), speaker(s), projector(s), any of the items noted above in connection with the input interface(s) 130, and/or combinations thereof. In one or more arrangements, the output interface(s) 140 can be provided in any suitable location onboard the pickup truck, including on the exterior of the pickup truck, within the interior of the pickup truck, within the cargo space of the pickup truck, and/or on the bed 150. In one or more arrangements, the output interface(s) 140 can be provided on a remote device and/or a portable device, such as a key fob or a portable communication device (e.g., smartphone, tablet computer, etc.).

The bed manipulation system 100 can include a bed 150. The bed 150 can be configured such that a user can access a tailgate of the bed 150 from either side of the pickup truck, e.g., a driver side or a passenger side. The bed 150 can be in any suitable configuration, and various examples will be described herein. The bed 150 can include a standard position and can be selectively rotatable into one or more rotated positions. Examples of these and other positions will be described herein. In one or more arrangements, the movement of the bed 150 can be controlled by the processor(s) 110. In one or more arrangements, the movement of the bed 150 can be performed, at least in part, manually by a person.

The bed manipulation system 100 can include one or more actuators 160. The actuator(s) 160 can be operatively connected to the bed 150. The actuator(s) 160 can include pneumatic actuators, hydraulic pistons, electromechanical actuators, relays, solenoids, and/or piezoelectric actuators, just to name a few possibilities. The actuator(s) 160 can include piston(s), push and/or pull bar(s) or rod(s), pulley(s), rigid link(s), rigid arm(s), gear(s), gear track(s), magnet(s), motor(s), other rigid members, and/or combinations thereof, just to name a few possibilities. The actuators(s) 160 can be selectively activated to cause movement of the bed 150 from the standard position to the one or more rotated positions. The actuator(s) 160 can be selectively activated to cause the bed 150 to be moved into and out of various positions (e.g., the standard position, one of the one or more rotated positions, etc.). In one or more arrangements, the actuator(s) 160 can be activated responsive to receiving signals or other inputs from a user, such as via the input interface(s) 130.

The bed manipulation system 100 can include one or more sensor(s) 170. "Sensor" means any device, component and/or system that can detect, determine, assess, measure, quantify and/or sense something, directly or indirectly. The one or more sensors can be configured to detect, determine, assess, measure, quantify and/or sense information in real-time. As used herein, the term "real-time" means a level of processing responsiveness that a user or system senses as sufficiently immediate for a particular process or determination to be made, or that enables the processor to keep up with some external process. In arrangements in which the bed manipulation system 100 includes a plurality of sensors, the sensors can work independently from each other or one or more of the sensors can work in combination with each other. The sensor(s) 170 and/or one or more sensors of the sensor(s) 170 can be operatively connected to the processor(s) 110, the data store(s) 120, the warning module(s) 180, and/or other element, system and/or component of the bed manipulation system 100. The processor(s) 110, the warning module(s) 180, and/or other element, system and/or component of the bed manipulation system 100 can process data or information acquired by the one or more sensors 170 to determine something.

The sensor(s) 170 can include any suitable type of sensor(s). For instance, the sensor(s) 170 can include one or more load sensors 172. The one or more load sensors 172 can be configured to detect, determine, assess, measure, quantify and/or sense, directly or indirectly, information about weight or load carried by the bed 150. In one or more arrangements, the load sensor(s) 172 can be a weight sensor. In one or more arrangements, the load sensor(s) 172 can be a torque sensor or other load sensors for the actuators(s) 160.

As another example, the sensor(s) 170 can include one or more environment sensors 174. In one or more arrangements, the environment sensor(s) 174 can be configured to detect, determine, assess, measure, quantify and/or sense, directly or indirectly the bed 150 and objects in an external environment in which the pickup truck located. Alternatively or additionally, the environment sensor(s) 174 can be configured to detect, determine, assess, measure, quantify and/or sense, directly or indirectly other portions of the pickup truck 200 relative to the bed or any portion thereof. The environment sensor(s) 174 can be any suitable sensor, now known or later developed, including proximity sensors, radar sensors, lidar sensors, optical sensors, sonar sensors, etc.

In one or more arrangements, the bed manipulation system 100 can include one or more warning modules 180. The warning module(s) 180 can be implemented as computer readable program code that, when executed by a processor, implement one or more of the various processes described herein. The warning module(s) 180 can be a component of the processor(s) 110, or the warning module(s) 180 can be executed on and/or distributed among other processing systems to which the processor(s) 110 is operatively connected. The warning module(s) 180 can include instructions (e.g., program logic) executable by one or more processor(s) 110. Alternatively or in addition, the one or more data stores 120 may contain such instructions.

The warning module(s) 180 can be configured to determine when the bed 150 is overloaded. The warning module(s) 180 can make such a determination in any suitable manner. For instance, using data acquired by the one or more load sensors 172, the warning module(s) 180 can compare a determined weight of the cargo in the bed 150 to a predetermined weight threshold. When the determined weight is greater than the predetermined weight threshold, the warning module(s) 180 can be configured to present a warning or an alert and/or to cause a warning or an alert to be presented. As another example, using data acquired by the one or more load sensors 172, the warning module(s) 180 can compare a determined torque of the actuators(s) 160 to a predetermined torque threshold. When the determined torque is greater than the predetermined torque threshold, the warning module(s) 180 can be configured to present a warning or an alert and/or to cause a warning or an alert to be presented. Such warnings can apprise a user that the movement of the bed 150 into a rotated position is not advisable under current or predicted load conditions.

The warning module(s) 180 can be configured to determine when the bed 150 would interfere with other portions of the pickup truck and/or things in the external environment of the pickup truck. The warning module(s) 180 can make such a determination in any suitable manner. For instance, using data acquired by the one or more environment sensors 174, the warning module(s) 180 can compare a projected movement path of the bed 150 to locations of known structures near the bed 150. If it is determined that the movement of the bed 150 would cause the bed 150 to come into contact with other portions of the pickup truck and/or things in the external environment of the pickup truck, the warning module(s) 180 can be configured to present a warning or an alert and/or to cause a warning or an alert to be presented. Such warnings can apprise a user that the movement of the bed 150 into a rotated position is not advisable based on the current location of the bed 150 relative to other portions of the pickup truck and/or things in the external environment of the pickup truck.

In one or more arrangements described herein, at least a portion of the output interface(s) 140 and/or other component of the system can be activated to provide a warning. The warning can be any type of warning, including, for example, a visual warning. "Visual warning" is any output that provides an alert or warning in a manner that is perceptible to the human sense of sight. The visual warning can be presented by one or more components of the bed manipulation system 100 (e.g., one or more components of the output interface 140).

The warning can be an audial warning. "Audial warning" is any output that provides an alert or warning in a manner that is perceptible to the human sense of hearing. The audial warning can be presented by one or more components of the output interface 140, such as by being emitted over one or more speakers. The warning can be a haptic warning. "Haptic warning" is any output that provides an alert or warning in a manner that is perceptible to the human sense of touch. The haptic warning can be presented by one or more components of the output interface 140, such as by causing a vibration of a vehicle seat, a steering wheel, or on the input interface(s) 130.

Figure 2:
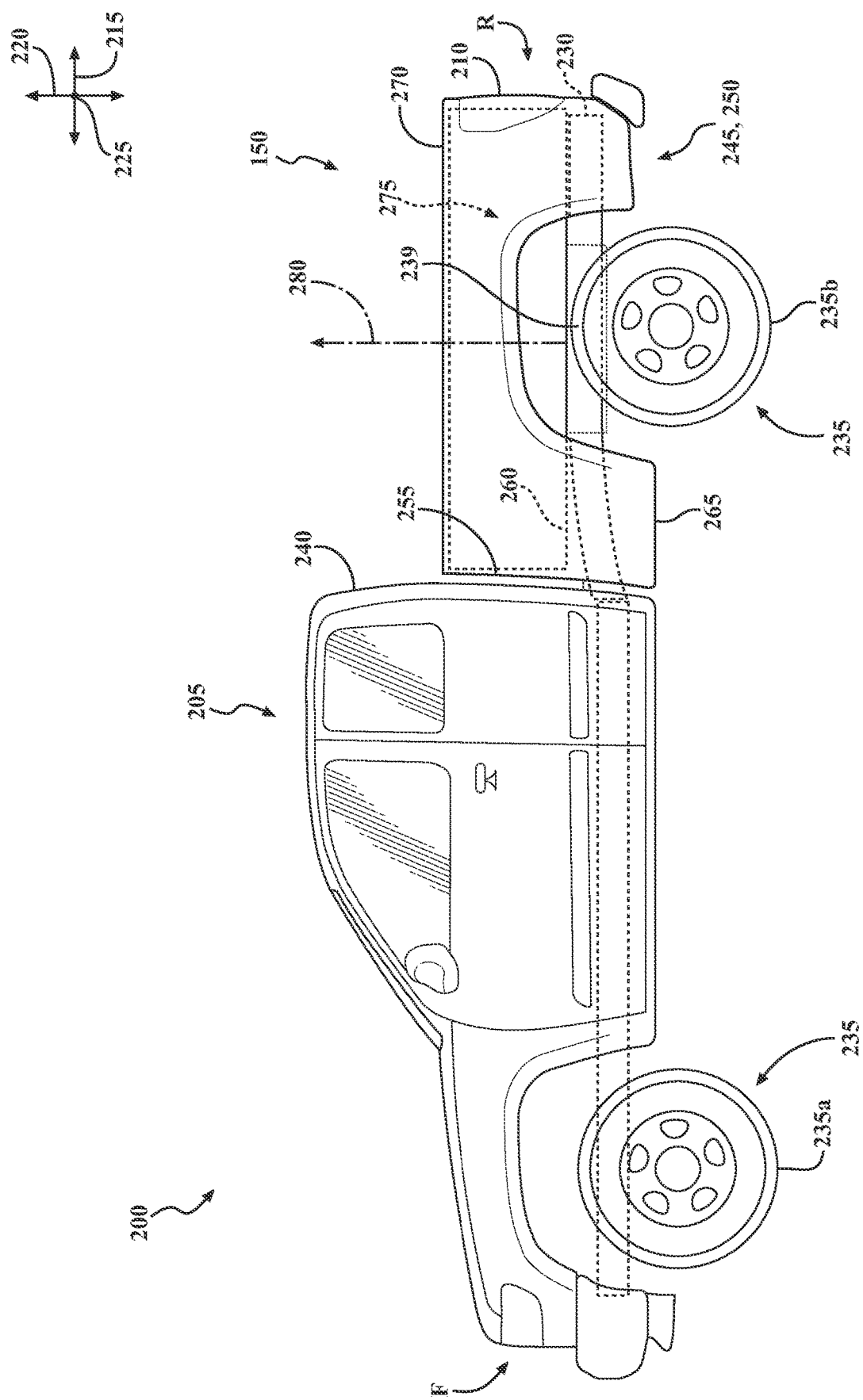
FIG. 2 is an example of a pickup truck with a bed manipulation system, showing a bed of the pickup truck in a standard position.
Figure 3:
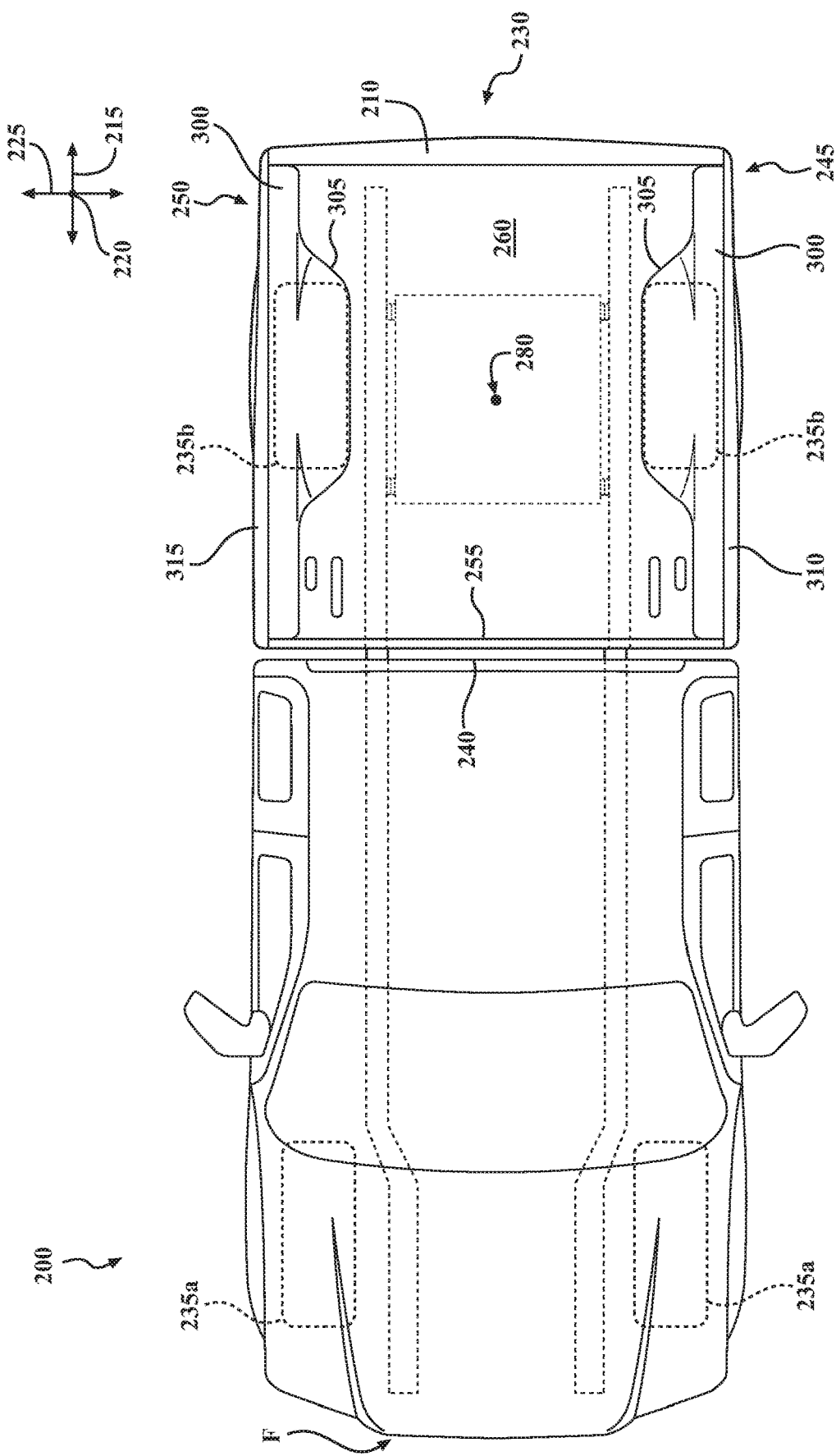
FIG. 3 is a top view of the pickup truck of FIG. 2.

Referring to FIGS. 2-3, arrangements described herein can be used in connection with a pickup truck 200. As used herein, "pickup truck" means any form of motorized transport truck that includes a cabin and a bed. The bed 150 can include sidewalls having a lowermost point that is aligned with or below a chassis frame 230 of the pickup truck 200. In one or more implementations, the pickup truck 200 can have a Federal Highway Administration (FHWA) vehicle class rating ranging from 1-7 and a duty classification of light, medium, or heavy, as defined by the U.S. Department of Energy: Vehicle Weight Classes & Categories (June 2012), which is incorporated herein by reference.

Referring to FIGS. 2-3, an example of a pickup truck 200 is shown. The pickup truck 200 can include a cabin 205 and a bed 150. The pickup truck 200 can include a forward end F and a rearward end R. The pickup truck 200 can have an associated longitudinal direction 215. The longitudinal direction 215 can generally correspond to the forward-rearward direction of the pickup truck 200. The pickup truck 200 can have an associated elevational direction 220. The elevational direction 220 can be substantially perpendicular to the longitudinal direction 215. The elevational direction 220 can generally correspond to the top-bottom direction of the pickup truck 200. The pickup truck 200 can have an associated lateral direction 225, which can be substantially perpendicular to the longitudinal direction 215, as well as the elevational direction 220. The lateral direction 225 can generally correspond to the left-right direction of the pickup truck 200. As used herein, the term "substantially" or "about" includes exactly the term it modifies and slight variations therefrom (e.g., within normal manufacturing tolerances, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less.

The pickup truck 200 can include the chassis frame 230. The chassis frame 230 can generally extend in the longitudinal direction 215. Moreover, the pickup truck 200 can include four or more tires 235. As shown in FIG. 2-3, for example, the pickup truck can include front tires 235a proximate the forward end F and rear tires 235b proximate the rearward end R. In some arrangements, the pickup truck can include four rear tires 235b, e.g., in a "dually" configuration. The front tires 235a and the rear tires 235b can be operatively connected to the chassis frame 230. A suspension system of the pickup truck 200 can determine a height of the chassis frame 230 relative to the tires 235 in the elevational direction 220. The suspension system can be any type of suspension, now known or later developed. For example, the chassis frame 230 can be substantially aligned with a top 239 of the rear tires 235b, as shown in FIG. 2. Alternatively, the chassis frame 230 can be located above or located below the top 239 of the rear tires 235b in the elevational direction 220.

The pickup truck 200 can include a cabin 205. The cabin 205 can be located substantially proximate to the bed 150. The cabin 205 can be supported by the chassis frame 230. The cabin 205 can be a compartment or seating area for passengers.

The bed 150 can be supported by the chassis frame 230, which is discussed in more detail below. The bed 150 can be defined by one or more structures of the pickup truck 200. For instance, the bed 150 can be defined at least in part by a first side wall 245, a second side wall 250, a front wall 255, a rear wall (e.g., a tailgate 210), and a floor 260. In one or more arrangements, a lowermost point 265 of the bed 150 can be substantially aligned with or located below the chassis frame 230 in the elevational direction 220. For example, the lowermost point 265 of the bed 150 can be located below the chassis frame 230, as shown in FIG. 2. As set forth below, in one or more arrangements, the lowermost point 265 of the bed 150 can be located above the chassis frame 230 and the tires 235. The bed 150 can define a space, which can be substantially rectangular. A top 270 of the bed 150 can be open. In some instances, the top 270 of the bed 150 can be at least partially closed by a tonneau cover, topper, or other element.

The first side wall 245 can be spaced from and opposite to the second side wall 250. The first side wall 245 and the second side wall 250 can be substantially parallel to the longitudinal direction 215. The first side wall 245 and the second side wall 250 can be substantially parallel to each other. The front wall 255 and the tailgate 210 can be substantially parallel to each other. The front wall 255 and the tailgate 210 can be substantially parallel to the lateral direction 225.

The first side wall 245 and the second side wall 250 can include inner wall members 300. The inner wall members 300, the front wall 255, the floor 260, and the tailgate 210 can form a cargo opening 275 in the bed 150. The cargo opening 275 can allow the pickup truck 200 to be utilized in many different ways, including carrying or storing various types of cargo (e.g., tools, groceries, sporting equipment, etc.). The inner wall members 300 can include indentations 305 to accommodate the tires 235.

The first side wall 245 and the second side wall 250 can include a first outer wall member 310 and a second outer wall member 315, respectively. In one or more arrangements, the first outer wall member 310 and/or the second outer wall member 315 can define at least in part the top 270 and/or the lowermost point 265 of the bed 150 in the elevational direction 220. In one or more arrangements, the first outer wall member 310 and the second outer wall member 315 can be defined by vehicle body panels. As shown in FIGS. 2-3, for example, the first outer wall member 310 can extend below the chassis frame 230 in the elevational direction 220 to the lowermost point 265 of the bed 150. In one or more arrangements, the bed 150 can be arranged such that the first outer wall member 310 and the second outer wall member 315 are above the chassis frame 230 and the rear tires 235b.

The bed 150 can include the standard position. An example of the bed 150 in the standard position is shown in FIGS. 2-3. In one or more arrangements, when the bed 150 is in the standard position, the first side wall 245 and the second side wall 250 are substantially parallel to the longitudinal direction 215 of the pickup truck 200. The standard position can include the lowermost point 265 of the bed 150 being substantially aligned with or below the chassis frame 230 in the elevational direction 220. For example, FIGS. 2-3 show the bed 150 in the standard position that includes the lowermost point 265 of the bed 150 being located below the chassis frame 230.

The bed 150 can be selectively rotatable about an axis of rotation 280 into the one or more rotated positions, for example as shown in FIGS. 2-3. In one or more arrangements, when the bed 150 is in one of the one or more rotated positions, the first side wall 245, i.e. and the second side wall 250 can be angled relative to the longitudinal direction 215 and the pickup truck 200. Additionally, the first outer wall member 310 and the second outer wall member 315 can be raised in the elevational direction 220 such that the lowermost point 265 of the bed 150 is located above a chassis frame 230 of the pickup truck 200. In some arrangements where the top 239 of the rear tires 235b are located above the chassis frame 230, the first outer wall member 310 and the second outer wall member 315 can be raised in the elevational direction 220 such that the lowermost point 265 of the bed 150 is located above the rear tires 235b.

In one or more arrangements, the bed 150 can have a range of rotation when in the one or more rotated positions of at least substantially 90 degrees about the axis of rotation 280. The bed 150 can rotate in a clockwise direction and/or a counterclockwise direction about the axis of rotation 280. In some arrangements, the range of rotation about the axis of rotation 280 can be greater than 90 degrees, such as substantially 100 degrees, substantially 110 degrees, substantially 120 degrees, substantially 130 degrees, substantially 140 degrees, substantially 150 degrees, substantially 160 degrees, substantially 170 degrees, or substantially 180 degrees in the clockwise direction and/or the counterclockwise direction about the axis of rotation 280. In some arrangements, the bed 150 can be configured to rotate substantially 360 degrees in the clockwise direction and/or the counterclockwise direction about the axis of rotation 280. In some arrangements, the bed 150 can rotate in only one of the clockwise or counterclockwise direction.

It will be appreciated that there are various ways of manipulating the bed 150 to prepare the bed 150 for rotation. However, with the bed 150 in the standard position, potential interferences should be overcome in order for the bed 150 to be rotated into the one or more rotated positions. There may be one potential interference when the lowermost point 265 of the bed 150 is below or aligned with the chassis frame 230 and/or the top 239 of the rear tires 235b. In such case, the bed 150 may be raised in the elevational direction 220 such that the lowermost point 265 of the bed is located above both the chassis frame 230 and/or the top 239 of the rear tires 235b to prepare the bed 150 for rotation. Another potential interference may exist when the front wall 255 of the bed 150 is located too close to the back 240 of the cabin 205. The bed 150 may be moved away from the cabin 205 in the longitudinal direction 215 toward the rearward end R to prepare the bed 150 for rotation.

Accordingly, one way of configuring the pickup truck 200 to move the bed 150 from the standard position to the one or more rotated positions while avoiding the above-mentioned potential interferences will be described below along with supporting figures as illustrated in FIGS. 4-11.

Figure 4:
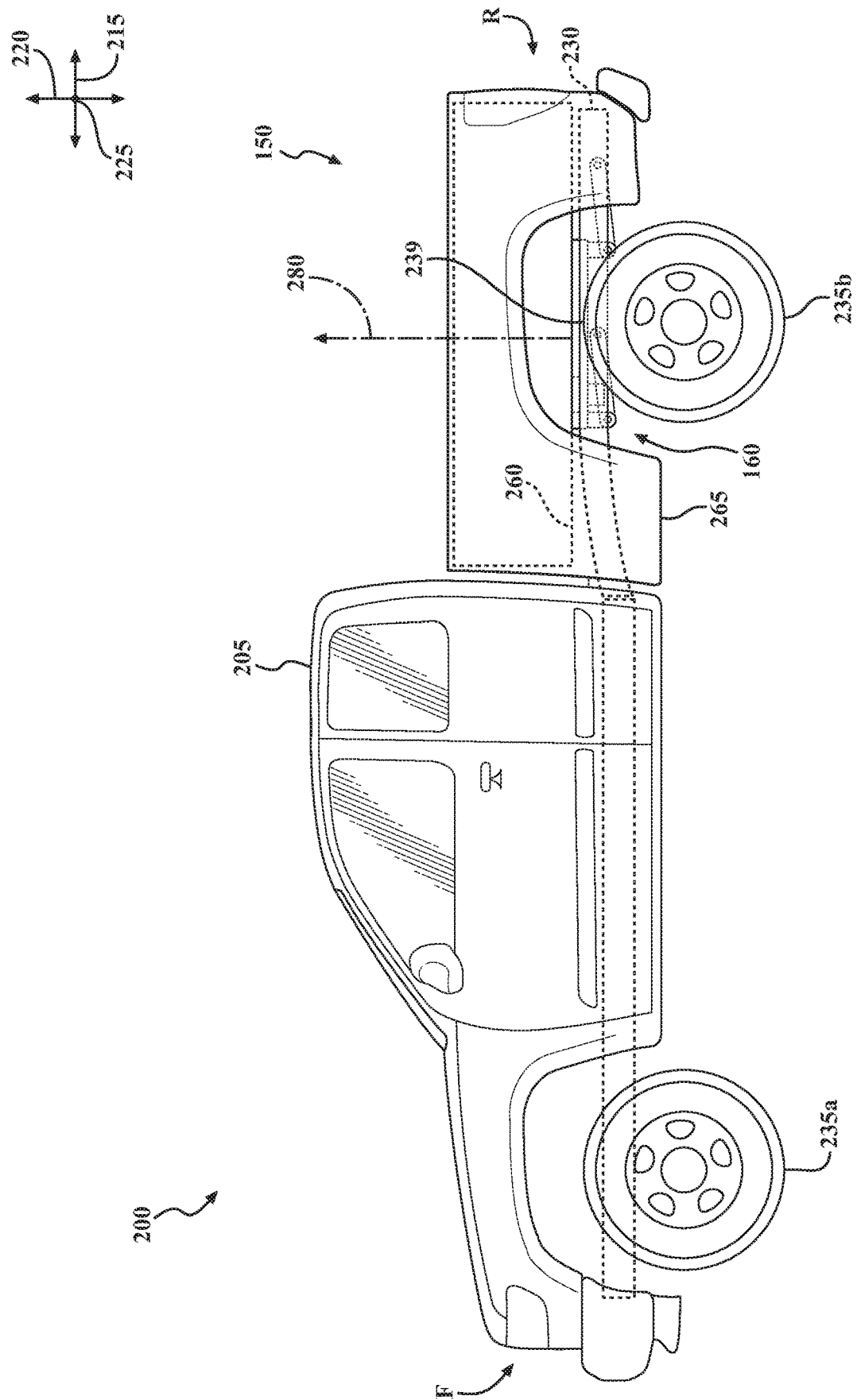
FIG. 4 is an example of the pickup truck with the bed in the standard position, showing one or more actuators for manipulating the bed.

With reference to FIG. 4, the pickup truck 200 is shown with the bed 150 in the standard position. The pickup truck 200 can include the actuator(s) 160 that can be configured to move the bed 150 from the standard position to the one or more rotated positions. In the standard position, the bed 150 can be at its lowest point in the elevational direction 220. In one or more arrangements, the floor 260 can be in contact with the chassis frame 230. The standard position would be considered a typical position for traveling on a roadway. The bed 150 can be locked to the chassis frame 230 in the standard position to prevent the bed 150 from moving while traveling.

Figure 5:
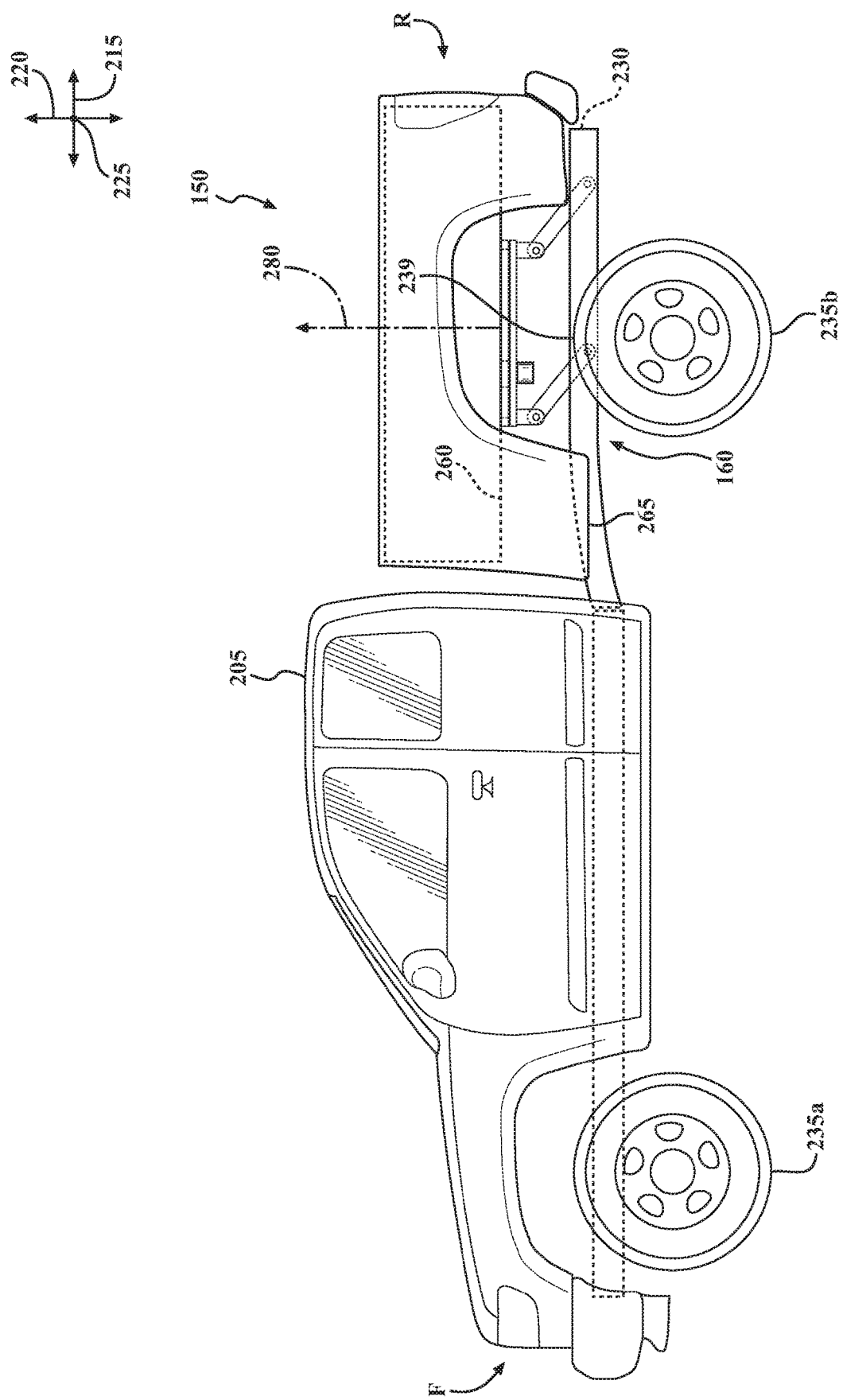
FIG. 5 is an example of the pickup truck, showing the bed being in the process of moving from a standard position and into an intermediate position.
Figure 6:
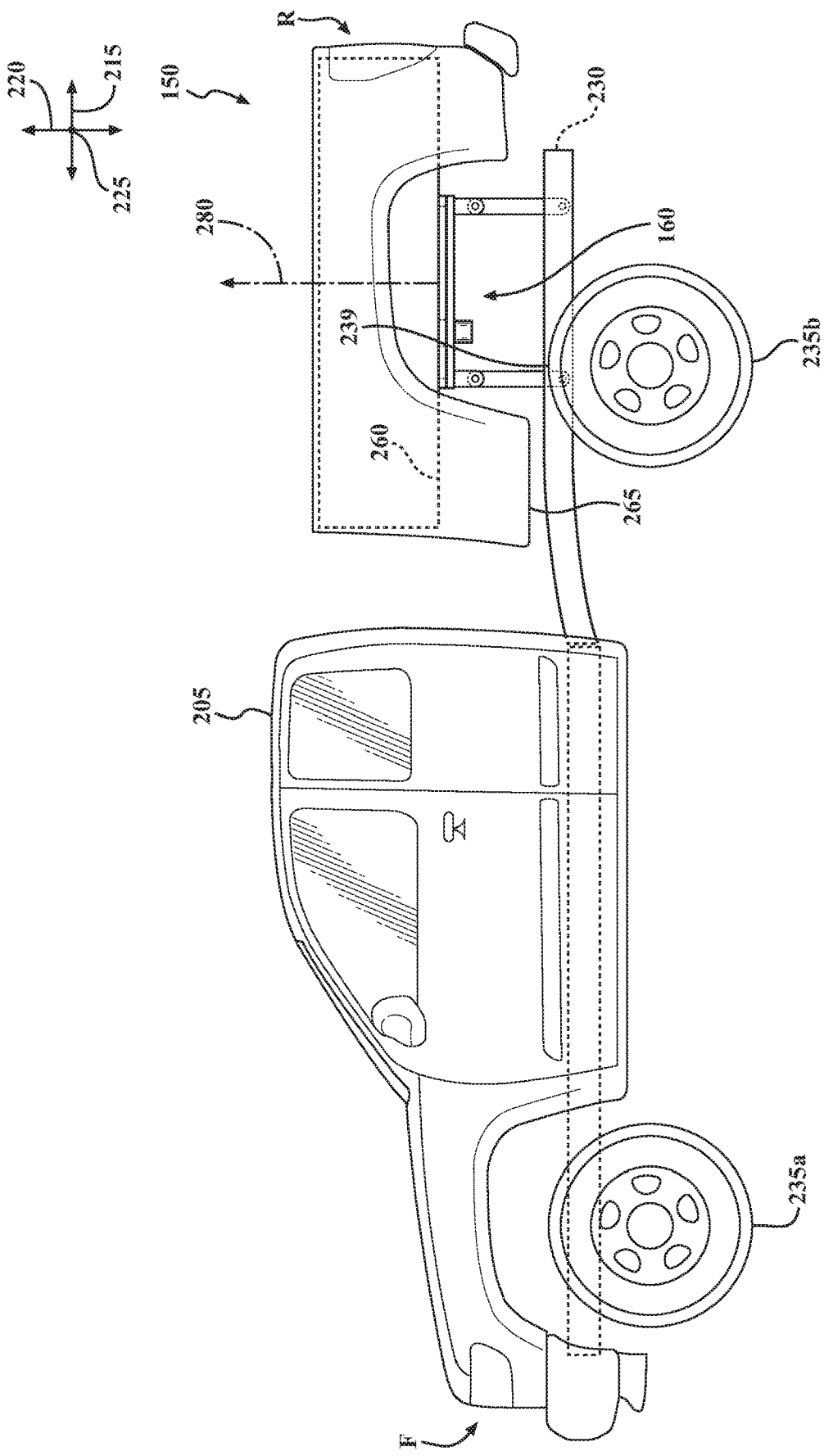
FIG. 6 is an example of the pickup truck with the bed in the intermediate position.

In some arrangements, the bed 150 can be rotated directly from the standard position. However, in other arrangements, there may be potential interferences between the bed 150 and other portions of the pickup truck 200 that would prevent rotation of the bed 150 directly from the standard position. In such cases, to prepare the bed 150 for rotation, the bed 150 can be positioned such that potential interferences between the bed 150 and other portions of the pickup truck 200 are avoided. FIGS. 4-6 show the bed 150 being moved from the standard position to a position in which potential interferences between the bed 150 and other portions of the pickup truck 200 are avoided.

In one or more arrangements, the bed 150 can be moved simultaneously in both the elevational direction 220 and the longitudinal direction 215. In one or more arrangement, the bed 150 can first be moved in the elevational direction 220. Subsequently, the bed 150 can be moved in the longitudinal direction 215 toward the rearward end R. The bed 150 can move from the standard position to a position in which potential interferences between the bed 150 and other portions of the pickup truck 200 are avoided using a combination of movements of the bed 150 such that the lowermost point 265 of the bed 150 is located at an elevation where, when rotated, it would not contact the rear tires 235b and/or the chassis frame 230.

In the arrangement shown in FIG. 6, the bed is in an intermediate position in which the bed 150 is ready for rotation. Thus, the bed 150 can be rotated without the interferences into the one or more rotated positions. In one example, when the bed 150 is in the intermediate position, the lowermost point 265 of the bed 150 can be located above the chassis frame 230 and the top 239 of the rear tires 235b. Additionally, the front wall 255 is sufficiently spaced from the back 240 of the cabin 205 in the longitudinal direction 215 such that it would not contact the back 240 of the cabin 205 when the bed 150 is rotated.

The bed 150 can be selectively movable between the standard position and the one or more rotated positions. Such selective movement of the bed 150 can be achieved in any suitable manner, such as by the one or more actuators 160. The one or more actuators 160 can be arranged in any suitable location of the pickup truck 200, including for example, along the chassis frame 230, along the floor 260 of the bed 150, etc. In some instances, the actuators(s) 160 may not be visible to a person during normal use. In some implementations, at least some of the movement of the bed 150 can be caused by manual manipulation of the bed 150. In some instances, the bed 150 can be locked in place when the bed 150 is moved to a desired: rotated position, elevation, and/or longitudinal distance away from the back 240 of the cabin 205. Such locking can be performed by any suitable locking mechanism, now known or later developed, including, a barrel bolt/plate mechanism, a plunger latch mechanism, etc.

The pickup truck 200 can include various actuators 160 for effectuating such movements. In some arrangements, the one or more actuators 160 can include one or more first actuators. The first actuator(s) can be operatively connected to the bed 150 and can be configured to cause the bed 150 to move in the elevational direction 220. In one or more arrangements, the one or more actuators 160 can include one or more second actuators. The second actuator(s) can be operatively connected to the bed 150 and can be configured to cause the bed 150 to move in the longitudinal direction 215. In one or more arrangements, the first actuator(s) and the second actuator(s) can be configured to cause the bed 150 to simultaneously move in the elevational direction 220 and in the longitudinal direction 215 from, for example, the standard position to the intermediate position, as shown in FIGS. 4-6.

Figure 7:
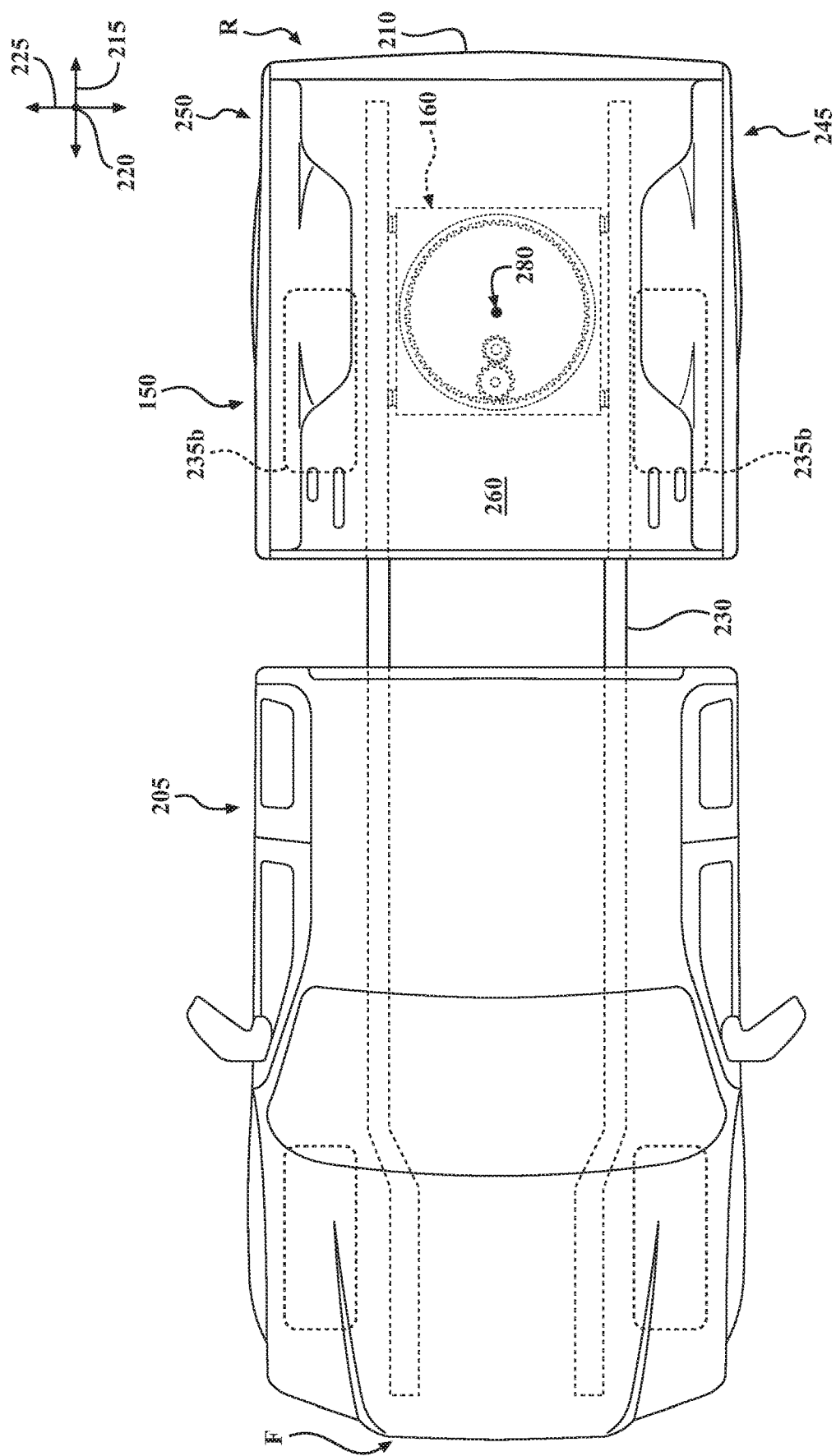
FIG. 7 is a top view of the pickup truck of FIG. 6.
Figure 8:
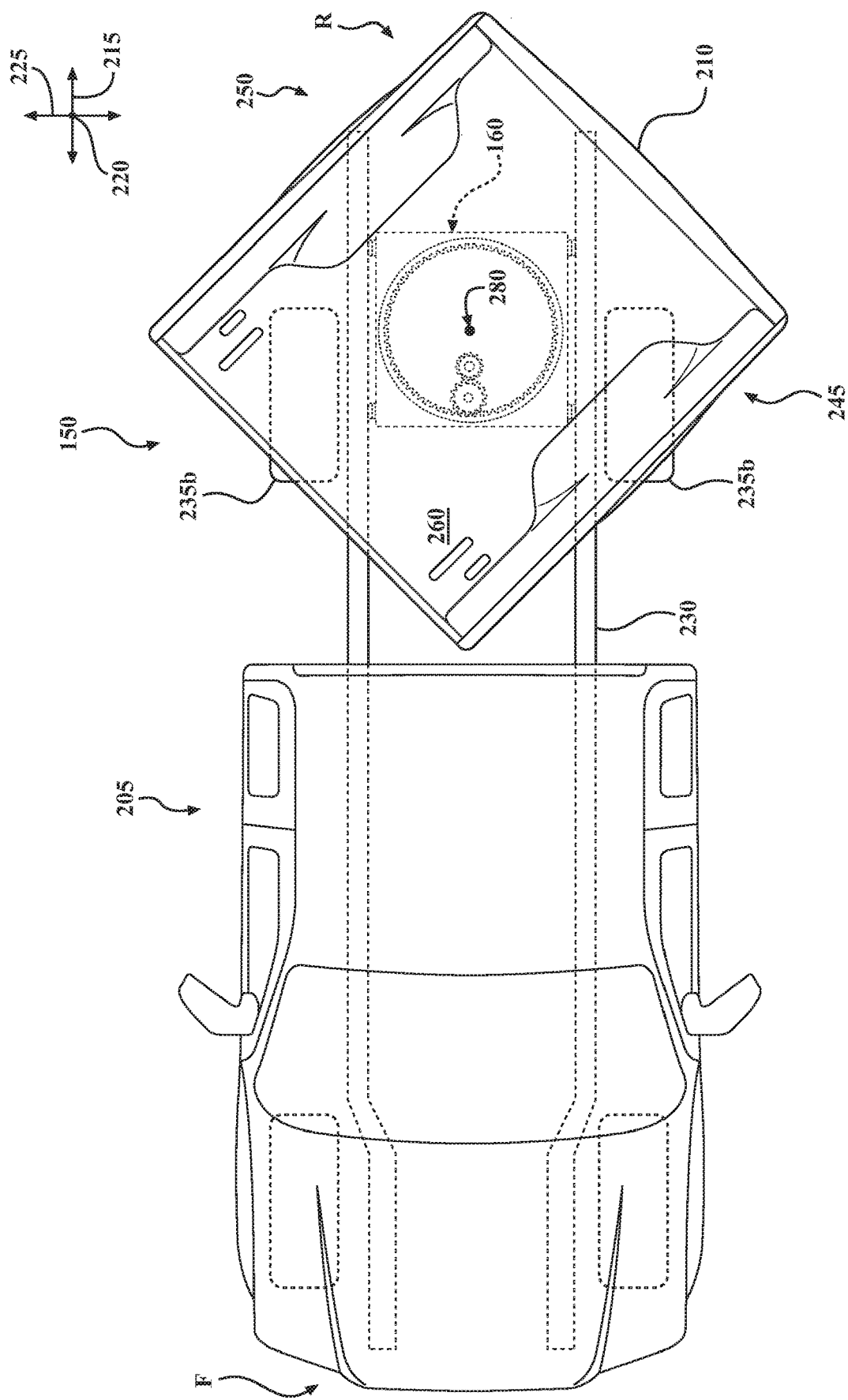
FIG. 8 is an example of the pickup truck with the bed in a rotated position that is substantially 45 degrees relative to the standard position.
Figure 9:
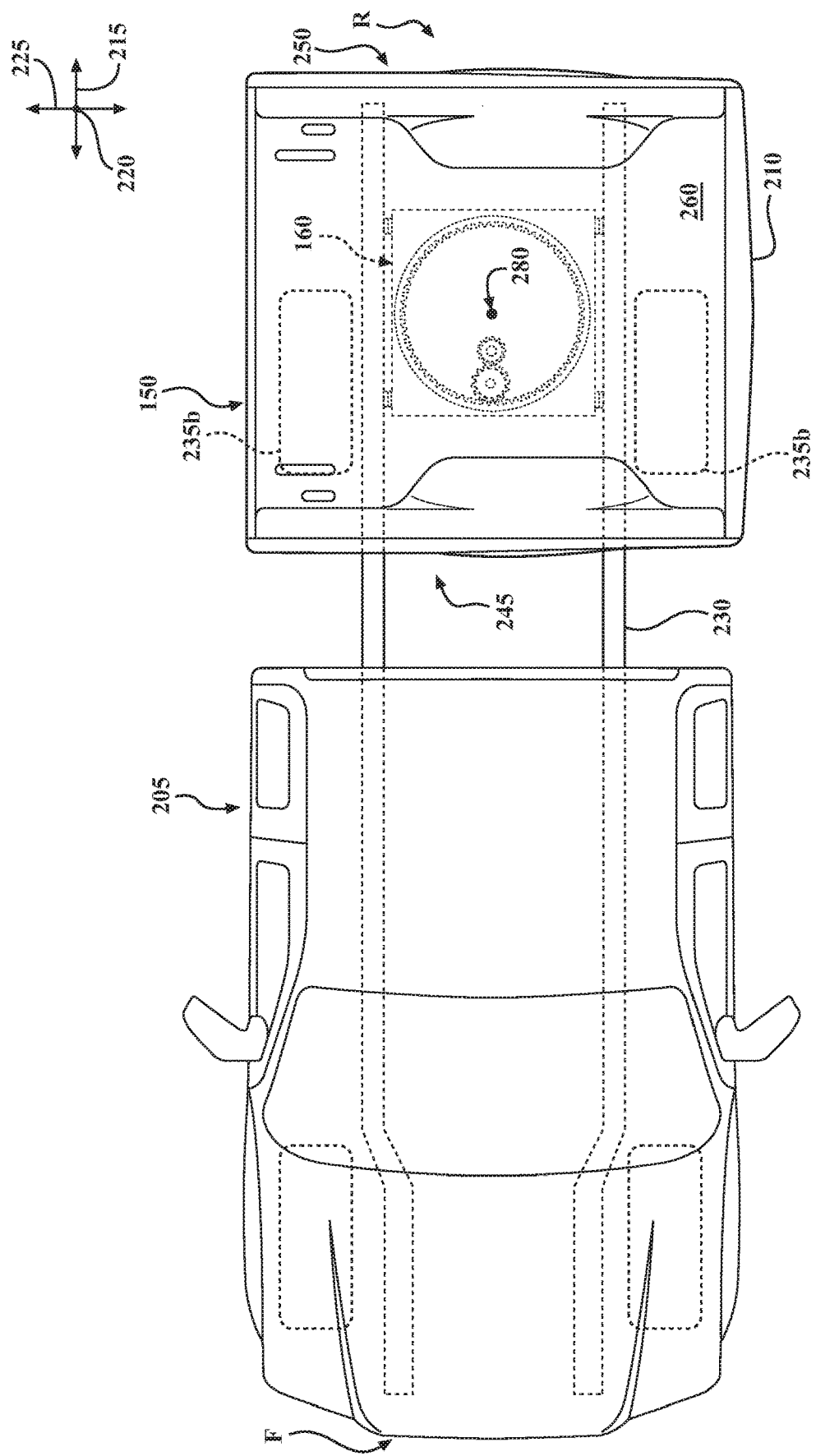
FIG. 9 is an example of the pickup truck with the bed in a rotated position that is substantially 90 degrees relative to the standard position.

In one arrangement, the one or more actuators 160 can include one or more third actuators. The third actuator(s) can be configured to cause the bed 150 to rotate about the axis of rotation 280 into the one or more rotated positions. With reference to FIGS. 6-9, the third actuator(s) can cause the bed 150 to rotate about the axis of rotation 280 from a substantially zero degree rotated position, as shown in FIG. 7, through a substantially 45 degree rotated position, as shown in FIG. 8, to at least a substantially 90 degree rotated position, as shown in FIG. 9. In one or more implementations, if the lowermost point 265 is above the chassis frame 230 and the top 239 of the rear tires 235*b*, the second actuator(s) and the third actuator(s) can be configured to simultaneously move the bed 150 away from the cabin 205 and rotate the bed 150.

Figure 10:
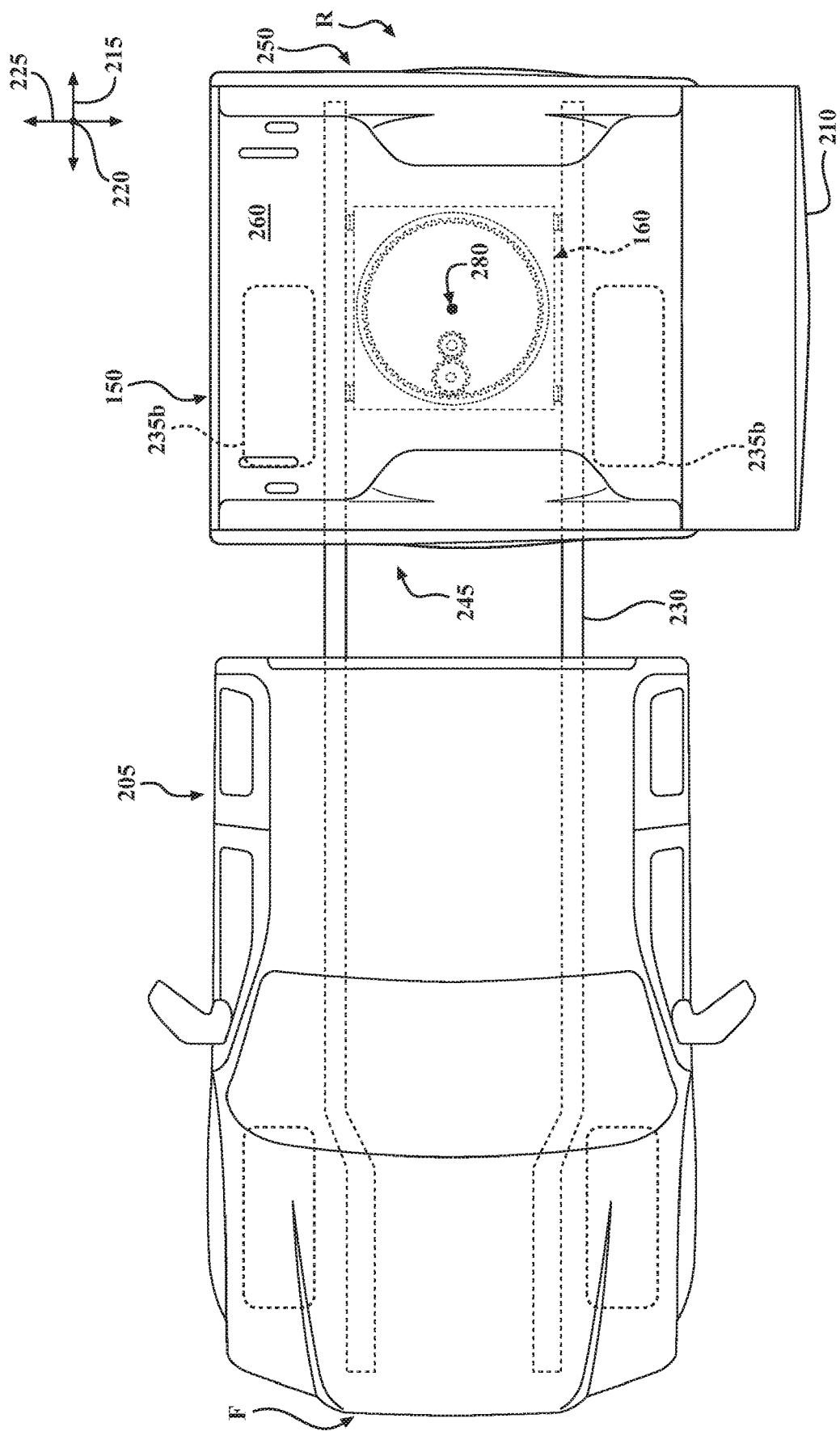
FIG. 10 is a view of the pickup truck of FIG. 9, showing the tailgate opened.

As shown in FIG. 10, the bed 150, for example, can be in the substantially 90 degree rotated position with the tailgate 210 in a down position facing the driver side of the pickup truck 200. The third actuator(s) can be configured to rotate the bed 150 one-hundred-eighty degrees counterclockwise where the tailgate 210 is facing the passenger side. The tailgate 210 can be in the down position, for example, in any rotated position. In some arrangements, when the bed 150 is in a rotated position, the second actuator(s) can be configured to cause the bed 150 to move closer to the back 240 of the cabin 205. In some arrangements, when the bed 150 is in a rotated position, the first actuator(s) can be configured to cause the bed 150 to move downward in the elevational direction. More particularly, the first actuator(s) can be configured to cause the bed 150 to move downward in the elevational direction such that the bed 150 is supported on the chassis frame 230. In some arrangements, the bed 150 can rotate beyond the substantially 90 degree rotated position.

In some instances, the warning module(s) 180 can be configured to determine when the bed 150 comes within a predetermined distance to, for example, the cabin 205, rear tires 235*b*, the chassis frame 230, other portions of the pickup truck 200, and/or the objects in the external environment in which the pickup truck 200 is located. For instances, the warning module(s) 180 can utilize data acquired from the environment sensor(s) 174 to determine the location of the bed 150 relative to other objects around the bed 150. When the bed 150 comes within the predetermined distance to, for example, the cabin 205, rear tires 235*b*, the chassis frame 230, other portions of the pickup truck 200, and/or objects around the external environment of the pickup truck, the warning module(s) 180 can be configured to present a warning or an alert or cause a warning or an alert to be presented.

In one or more arrangements, when the bed 150 moves from the standard position to the one or more rotated positions, for example, via the one or more actuator(s) 160, the bed 150 moves in the elevational direction 220, the longitudinal direction 215 and rotates about the axis of rotation 280. For the purpose of brevity, "actuator(s) 160" will be used when referring to the first actuator(s), the second actuator(s), the third actuator(s), or any combination thereof.

Figure 11:
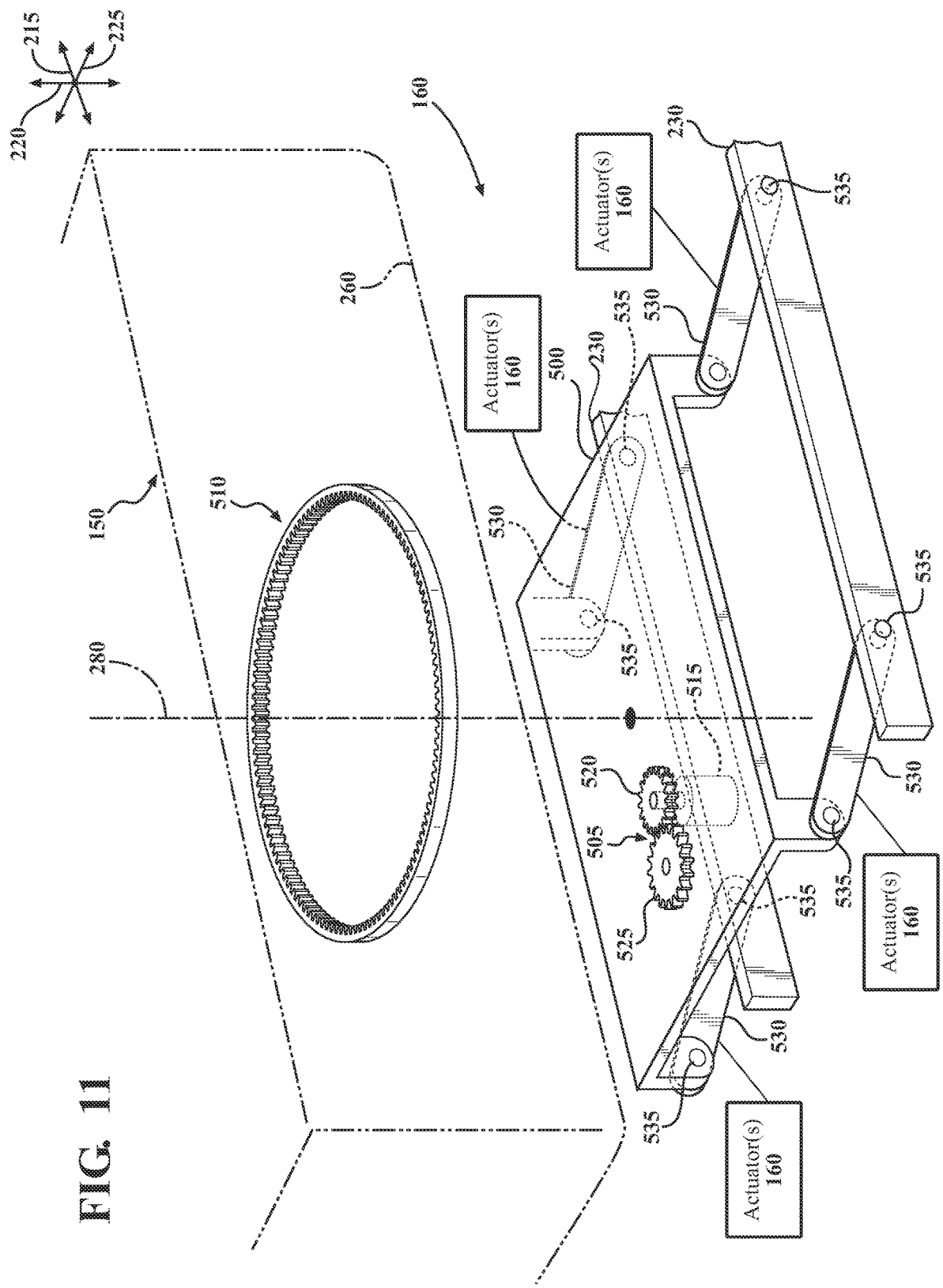
FIG. 11 is an example of one or more actuators configured to move the bed of the pickup truck from the standard position into one or more rotated positions.

FIG. 11 shows is an example of the one or more actuators 160 configured to move the bed of the pickup truck from the standard position to one or more rotated positions. At least a portion of the actuator(s) 160 can couple the bed 150 to the chassis frame 230. For example, the actuator(s) 160 can include a platform 500 that couples the floor 260 of the bed 150 to the chassis frame 230. The platform 500 can be located between portions of the chassis frame 230, e.g., as shown in FIG. 7. The platform 500 can be operatively connected to the chassis frame 230, and the platform 500 can be movable relative to the chassis frame 230.

The actuator(s) 160 configured to cause the bed 150 to rotate can include a gear set 505, a ring gear 510, and a motor 515. The gear set 505 can include an inner gear 520 and an outer gear 525. The gear set 505 and the motor 515 can be operatively connected to the platform 500, and the motor 515 can be operatively connected to the gear set 505, e.g., the inner gear 520. The ring gear 510 can be mounted to the floor 260 of the bed 150. The ring gear 510 can be coupled to the platform 500 via a, for example, circular bearing (not shown), such that the ring gear 510 can rotate relative to the platform 500. When the actuator(s) 160 are activated, rotational motion from the motor 515 is transferred to the gear set 505 and the ring gear 510 to rotate the bed 150 relative to the platform 500, and thus the chassis frame 230.

The actuator(s) 160 configured to cause the bed 150 to move in the elevational direction 220 and/or the longitudinal direction 215. The actuator(s) 160 can include rigid links 530 and one or more electro-mechanical actuators operatively connected to the rigid links 530. The electromechanical actuator(s) can be coupled to the rigid links 530 and the chassis frame 230. The rigid links 530 can be coupled to the platform and the chassis frame 230 via connectors 535. In one or more arrangements, the connectors 535 can allow the rigid links 530 to pivot relative to the chassis frame 230. When activated, the electromechanical actuator(s) can move the rigid links 530, which, in turn, causes the platform 500 to raise or lower simultaneously in the elevational direction 220 and the longitudinal direction 215. Alternatively, the electromechanical actuator(s) can be attached directly to the chassis frame 230 and the bed 150. In this case, when the actuator(s) 160 are activated, the electromechanical actuator(s) can operate on the bed 150 to raise and lower the bed 150 in the elevational direction 220. As yet another alternative, the electromechanical actuator(s) can be attached directly to the chassis frame 230 and the platform 500. In this case, when the actuator(s) 160 are activated, the electromechanical actuator(s) can operate on the platform 500 to move the bed 150 in the longitudinal direction 215 along, for example, a track (not shown).

Figure 12:
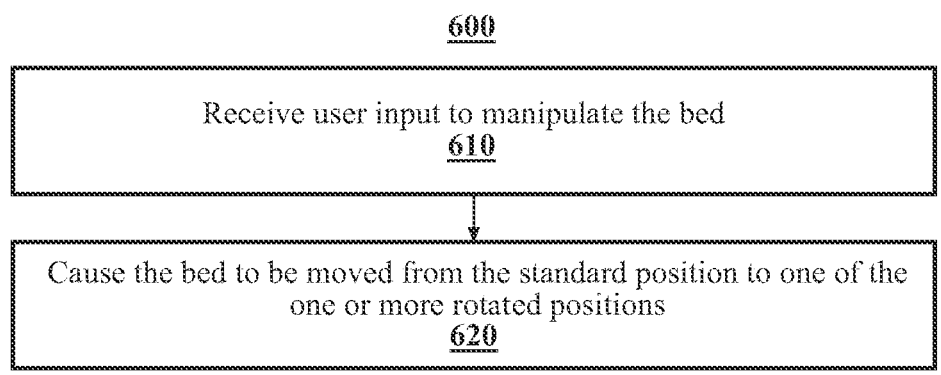
FIG. 12 is an example of a bed manipulation method.

Now that the various potential systems, devices, elements and/or components have been described, one example of a bed manipulation method will now be described. Referring to FIG. 12, an example of a bed manipulation method 600 is shown. Various possible steps of method 600 will now be described. The method 600 illustrated in FIG. 12 may be applicable to the embodiments described above in relation to FIGS. 1-11, but it is understood that the method 600 can be carried out with other suitable systems and arrangements. Moreover, the method 600 may include other steps, blocks and/or decision blocks that are not shown here, and in fact, the method 600 is not limited to including every step, block, or decision block shown in FIG. 12. The steps, blocks, and/or decision blocks that are illustrated here as part of the method 600 are not limited to this particular chronological order. Indeed, some of the steps, blocks and/or decision blocks may be performed in a different order than what is shown and/or at least some of the steps, blocks and/or decision blocks shown can occur simultaneously.

At block 610, a user input to manipulate the bed 150 can be received. In one or more arrangements, the user input can be received via an input interface, such as the input interface(s) 130, which can be provided on the pickup truck 200. For instance, the user can press a button provided within the pickup truck 200. In other instances, the input interface can include an application running on a mobile device, such as a smartphone or tablet computer. The user can engage with the application to provide the user input. As another example, the input interface can be provided on another mobile device, such as a key fob, that can have one or more buttons. The user can provide the user input by depressing one or more of the buttons. The user input can include a specified rotation position. For instance, the user may wish the bed 150 to rotate about 30 degrees, about 45 degrees, about 60 degrees, or about 90 degrees clockwise, or the user may wish the bed 150 to rotate about 30 degrees, about 45 degrees, about 60 degrees, or about 90 degrees counterclockwise. In some arrangements, the system may be configured to rotate the bed to a predetermined position. The method 600 can continue to block 620.

At block 620, responsive to receiving a user input to manipulation the bed 150, the bed 150 can be caused to move from the standard position to a rotated position. For instance, the bed 150 can be caused to be moved by the processor(s) 110 and the actuator(s) 160. In moving from the standard position to the one or more rotated positions, the bed 150 can undergo one or more movements. For instances, the bed 150 can and rotate about the axis of rotation 280. In some arrangements, the bed 150 can also move in the elevational direction 220 and/or the longitudinal direction 215. The movements of the bed 150 can avoid potential interferences between the bed 150 and other portions of the pickup truck 200 that may occur during the rotation of the bed 150. In the one or more rotated positions, the first side wall 245 and the second side wall 250 can be angled relative to the longitudinal direction 215. Additionally, the lowermost point 265 of the bed 150 can be located above the chassis frame 230 and/or the top 239 of the rear tires 235*b*. It should be noted that, once the bed is in a rotated position, the user can provide further user input to cause the be to move into a different rotated position, or the user can provide an input to cause the bed 150 to return to the standard position.

The method 600 can end. Alternatively, the method 600 can return to any of the above blocks, or it can continue to some other block.

A non-limiting example of the above-described systems, methods and/or arrangements will be described in relation to the above figures. For purposes of this example, the pickup truck 200 can be a light duty pickup truck with a class 2 FHWA vehicle classification (e.g., Toyota Tundra, etc.) with an open bed. For purposes of this example, the bed 150 can begin in the standard position and prepared for roadway travel.

A user may load mulch and topsoil into the bed 150 of the pickup truck 200 at a landscaping supply store. When the user arrives at home, the user may wish to unload the topsoil and the mulch on either side of a driveway. Instead of maneuvering the rearward end R of the pickup truck 200 in multiple positions to unload cargo, the user can maneuver the pickup truck 200 in the middle of the driveway. The user can provide input to the application to move the bed 150 from the standard position on the substantially 90 degree rotated position, e.g., the tailgate 210 facing the driver side or facing the passenger side. The user can move the pickup truck 200 while the bed 150 is in the rotated position. Alternatively, the user can restore the bed 150 to the standard position and lock the bed 150 to the chassis frame 230 before moving the pickup truck 200 along the driveway.

It will be appreciated that arrangements described herein can provide numerous benefits, including one or more of the benefits mentioned herein. For example, arrangements described herein can assist a user in loading cargo into and/or unloading cargo from a pickup truck. Arrangements described herein can minimize strain, exertion, and/or injury of the user in performing such activities. Arrangements described herein can provide flexibility to a user by placing the bed in one or more rotated positions, thus promoting ease-of-use. Arrangements described herein can facilitate the safe transport of cargo. Arrangements described herein can provide convenience to users of a pickup truck. Arrangements described herein can allow a user to place the bed in positions between the standard position and the intermediate position for added convenience. Arrangements described herein can potentially reduce the loading/unloading time.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A bed manipulation system for a pickup truck, the system comprising:
   a bed, the bed being defined in part by a first side wall, a second side wall, a front wall, a back wall, and a floor, the bed including a standard position, the bed being selectively rotatable about an axis of rotation into one or more rotated positions,
   when the bed is in the standard position, the first side wall and the second side wall being substantially parallel to a longitudinal direction of the pickup truck, and a lowermost point of the bed being located below a chassis frame of the pickup truck when in the standard position,
   when the bed is in one of the one or more rotated positions, the first side wall and the second side wall being angled relative to the longitudinal direction and the bed is raised in an elevational direction such that the lowermost point of the bed is located above the chassis frame of the pickup truck, the floor of the bed being substantially horizontal in the one or more rotated positions and when being rotated about the axis of rotation, when moving from the standard position to one of the one or more rotated positions, the bed moves rearward in the longitudinal direction, and the pickup truck including a cabin, the cabin being fixed, whereby the cabin does not change position between the standard position and the one or more rotated positions of the bed.

2. The system of claim 1, wherein the lowermost point of the bed is defined by a vehicle body panel.

3. The system of claim 1, wherein the bed has a range of rotation of at least substantially 90 degrees about the axis of rotation.

4. The system of claim 1, further including:
one or more processors operatively connected to control movement of the bed; and
an input interface operatively connected to the one or more processors, wherein the input interface is configured to receive inputs from a user to cause the bed to be selectively rotated about the axis of rotation.

5. The system of claim 4, wherein the input interface is located on one of a mobile device and the pickup truck.

6. The system of claim 1, further including:
one or more actuators configured to cause the bed to simultaneously move in the elevational direction and in the longitudinal direction.

7. The system of claim 1, further including:
one or more actuators operatively connected to the bed, wherein the one or more actuators are configured to cause the bed to rotate about the axis of rotation.

8. The system of claim 1, wherein in moving from the standard position to the one of the one or more rotated positions, the bed moves in the longitudinal direction, moves in the elevational direction, and rotates about the axis of rotation.

9. The system of claim 1, wherein when the bed is in the one or more rotated positions, the lowermost point of the bed is located above tires of the pickup truck in the elevational direction.

10. A bed manipulation method for a pickup truck, the pickup truck including a bed, the bed being defined in part by a first side wall, a second side wall, a front wall, a back wall, and a floor, the bed including a standard position in which the first side wall and the second side wall are substantially parallel to a longitudinal direction of the pickup truck, a lowermost point of the bed being located below a chassis frame of the pickup truck when in the standard position, and the bed being selectively rotatable about an axis of rotation into one or more rotated positions, the method including:

responsive to a user input to rotate the bed, causing the bed to move from the standard position to one of the one or more rotated positions, when the bed is in the one or more rotated positions, the first side wall and the second side wall are angled relative to the longitudinal direction and the bed is raised in an elevational direction such that the lowermost point of the bed is located above the chassis frame of the pickup truck, the floor of the bed being substantially horizontal in the one or more rotated positions and when being rotated about the axis of rotation, when moving from the standard position to one of the one or more rotated positions, the bed moves rearward in the longitudinal direction, and the pickup truck including a cabin, the cabin being fixed, whereby the cabin does not change position between the standard position and the one or more rotated positions of the bed.

11. The method of claim 10, wherein the lowermost point of the bed is defined by a vehicle body panel.

12. The method of claim 10, wherein the bed has a range of rotation of at least substantially 90 degrees about the axis of rotation.

13. The method of claim 10, further including:
receiving the user input to rotate the bed via at an input interface located on one of a mobile device and the pickup truck.

14. The method of claim 10, wherein causing the bed to move from the standard position to one of the one or more rotated positions includes causing the bed to move in the elevational direction.

15. The method of claim 10, wherein causing the bed to move from the standard position to one of the one or more rotated positions includes causing the bed to move in the longitudinal direction.

16. The method of claim 10, wherein causing the bed to move from the standard position to one of the one or more rotated positions includes causing the bed to rotate about the axis of rotation.

17. The method of claim 10, wherein causing the bed to move from the standard position to one of the one or more rotated positions includes:
causing the bed to move in the elevational direction;
causing the bed to move in the longitudinal direction; and
causing the bed to rotate about the axis of rotation.

18. The method of claim 10, wherein, in the one or more rotated positions, the lowermost point of the bed is located above tires of the pickup truck in the elevational direction.

\* \* \* \* \*